Oct. 28, 1930.   E. L. R. BLISS   1,780,110
COOLING MEANS FOR INCASED ELECTRICAL APPARATUS
Filed Jan. 5, 1929

Inventor:
Edwin L. R. Bliss,
by Charles E. Tullar
His Attorney.

Patented Oct. 28, 1930

1,780,110

UNITED STATES PATENT OFFICE

EDWIN L. R. BLISS, OF LANESBORO, MASSACHUSETTS, ASSIGNOR TO GENERAL ELECTRIC COMPANY, A CORPORATION OF NEW YORK

COOLING MEANS FOR INCASED ELECTRICAL APPARATUS

Application filed January 5, 1929. Serial No. 330,634.

My invention relates to cooling means for incased electrical apparatus and more particularly to transformers and other forms of electrical apparatus which are immersed in an insulating liquid within a suitable casing. The losses in such apparatus appear as heat and the maximum safe load is limited by the temperature rise due to this heat. It is customary to provide the apparatus casings with external radiators through which the insulating liquid may flow and be cooled, thus increasing the safe maximum load by increasing the rate at which the heat is dissipated. The insulating liquid which is usually used is a specially prepared oil having high dielectric strength. To maintain its high dielectric strength, the oil must be kept free from any appreciable amount of moisture and it should, as far as possible, be kept out of contact with oxygen, particularly when at a high temperature. The general object of the invention is to provide a completely sealed electrical apparatus casing containing insulating liquid and having an improved form of expansible external heat radiator both to cool the liquid and to permit its expansion and contraction under varying temperatures without contact with the surrounding air.

Figure 1:
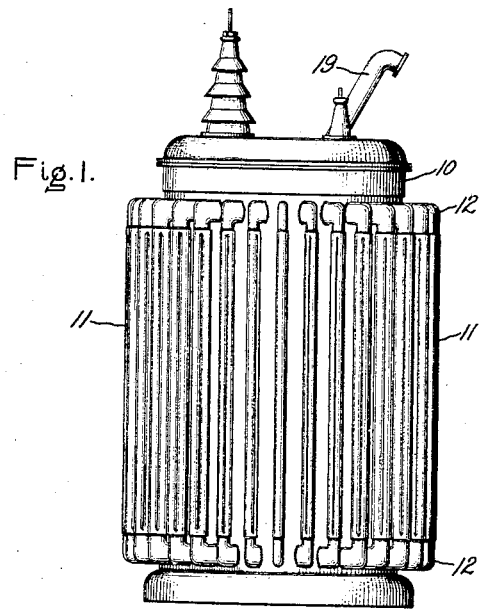
Figure 2:
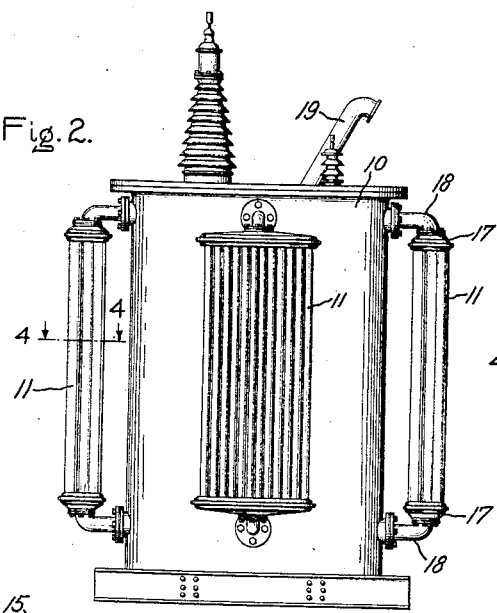
Figure 3:
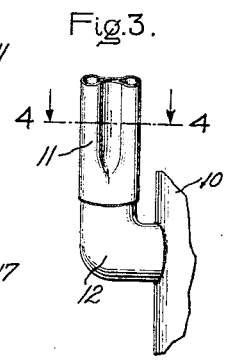
Figure 4:
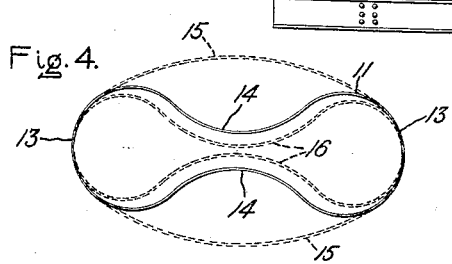

The invention will be better understood from the following description taken in connection with the accompanying drawing in which Fig. 1 shows a casing for an oil immersed transformer having external heat radiating tubes constructed in accordance with the invention, Fig. 2 shows a casing for an oil immersed transformer having another form of external tubular heat radiator, Fig. 3 shows a detail of construction, and Fig. 4 is an enlarged sectional view on the lines 4—4 of Figs. 2 and 3.

The invention is shown in Fig. 1 in connection with an incased oil immersed transformer, the casing 10 of the transformer being provided with a plurality of external vertical heat radiating tubes 11 communicating at their upper and lower portions of the casing. The oil absorbs heat from the transformer and rises by convection inside the casing, returning through the tubes 11 where it is cooled. The casing 10 may be completely filled with oil or there may be a space above the oil filled with gas, an inert gas being preferably used and the oil level being at least high enough to permit the oil to flow freely into the upper ends of the tubes 11.

The casing 10 is completely sealed from communication with the outside air so that none of the air with its moisture and oxygen can reach the oil to contaminate it. The oil, however, must expand and contact as its temperature changes, its volume being considerably more when hot than when cold. These changes in volume of the oil between no load and full load conditions of the apparatus are made possible without rupturing the casing or tubes by making the tubes expansible to hold any surplus oil forced out of the casing.

The tubes 11 have flexible walls which are non-circular in cross section, thin flexible sheet steel being a suitable material from which the walls may be made. When the temperature of the oil in the casing 10 increases, it expands and some of it is forced into the tubes 11. This increases the pressure in the tubes and forces their walls into a more nearly circular cross sectional shape so that their capacity is increased to receive the surplus oil from the casing 10. There is always a tendency of the tubes 11 to return to their normal non-circular shape and force oil back into the casing 10 whenever the oil in the casing cools and contracts, the normal amount of oil being thus substantially maintained at all times in the casing.

The lower end of one of the tubes 11 with an elbow 12 connecting it to the casing 10 is shown in Fig. 3. This tube has a cross sectional shape, more clearly shown in Fig. 4, which has been found to give good results. The tube has enlarged smoothly curved edge portions 13 merging gradually into smoothly curved spaced normally re-entrant side portions 14 so that the tube is non-circular in cross section but has no sharp angles or corners.

Under no load conditions with the oil at the lowest temperature usual under these conditions, the re-entrant side portions of the tubes should be spaced somewhat as shown in full lines in Fig. 4 and at the same time the tube walls should be strong enough to overcome the pressure of the oil. This will prevent any air being drawn into the casing 10 in case of leakage near the top of the casing. When the oil is heated and expanded, the tubes will expand under the increased internal pressure of the oil, the side portions 14 of the tubes separating toward the positions indicated by the dotted lines 15 of Fig. 4. If the oil occasionally reaches an unusually low temperature, the tubes may contract beyond the condition shown in full lines in Fig. 4, their side portions 14 approaching the positions indicated by the dotted lines 16.

Another arrangement of expansible tubes which may be used in accordance with the invention is shown in Fig. 2. The tubes 11 as shown in this figure are connected in groups between top and bottom headers 17 which communicate by pipe connections 18 with the upper and lower portions of the casing 10. The cross sectional shapes of these tubes may be the same as has already been described in connection with the tubes 11 of Fig. 1. Whatever the particular arrangement or cross-sectional shape of the tubes may be, a sufficient number of tubes should be used to provide the necessary change in volume required by the thermal expansion and contraction of the oil. If desired, some form of pressure relief device, such as the usual form of pressure relief pipe 19 sealed at the outer end by a rupturable diaphragm, may be provided to relieve any very sudden or excessive increase of pressure within the casing 10.

The invention has been explained by describing and illustrating certain particular forms thereof but it will be apparent that various changes may be made without departing from the scope of the invention as defined in the appended claims.

What I claim as new and desire to secure by Letters Patent of the United States, is:

1. The combination with a casing for electrical apparatus immersed in an insulating liquid within said casing, the casing being completely sealed from communication with the outside air, of heat radiating tubes filled with insulating liquid and connected to the upper and lower portions of said casing, whereby said liquid may flow through said tubes to be cooled, said tubes being expansible to permit thermal expansion and contraction of said liquid between no load and full load conditions of said apparatus.

2. The combination with a casing for electrical apparatus immersed in an insulating liquid within said casing, the casing being completely sealed from communication with the outside air, of heat radiating tubes filled with insulating liquid and connected to the upper and lower portions of said casing, whereby said liquid may flow through said tubes to be cooled, said tubes having flexible walls of non-circular cross-sectional shape to permit thermal expansion and contraction of said liquid between no load and full load conditions of said apparatus.

3. The combination with a casing for electrical apparatus immersed in an insulating liquid within said casing, the casing being completely sealed from communication with the outside air, of heat radiating tubes filled with insulating liquid and connected to upper and lower portions of said casing, whereby said liquid may flow through said tubes to be cooled, said tubes having flexible walls with enlarged edge portions connected by re-entrant side portions to permit thermal expansion and contraction of said liquid between no load and full load conditions of said apparatus.

4. The combination with a casing for electrical apparatus immersed in an insulating liquid within said casing, the casing being completely sealed from communication with the outside air, of heat radiating tubes filled with insulating liquid and connected to the upper and lower portions of said casing, whereby said liquid may flow through said tubes to be cooled, said tubes having flexible walls with enlarged smoothly curved edge portions connected by smoothly curved re-entrant side portions to permit thermal expansion and contraction of said liquid between no load and full load conditions of said apparatus.

In witness whereof, I have hereunto set my hand this 31st day of Dec., 1928.

EDWIN L. R. BLISS.